Nov. 6, 1956  W. D. HAILES  2,769,881
CONTACT ASSEMBLY FOR ELECTROMAGNETIC RELAYS
Filed March 15, 1954  4 Sheets-Sheet 1
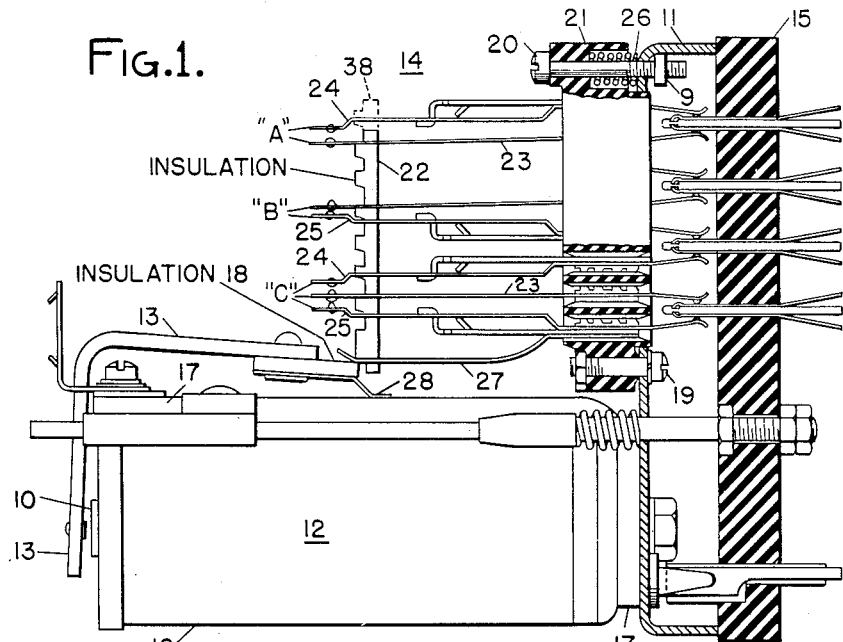
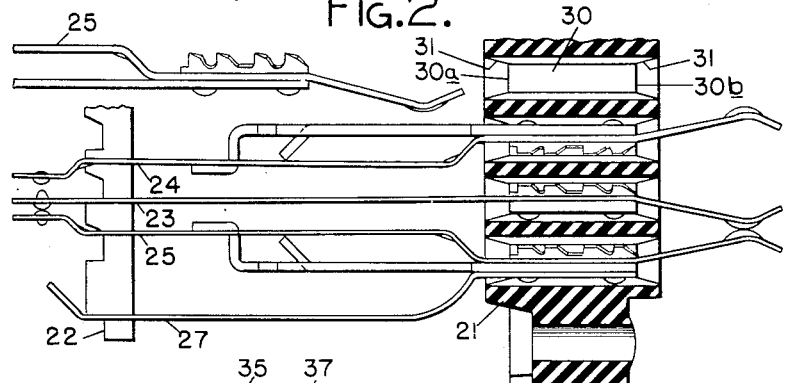
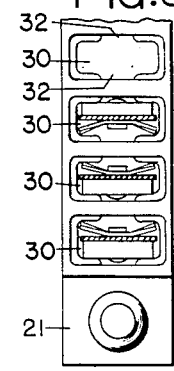
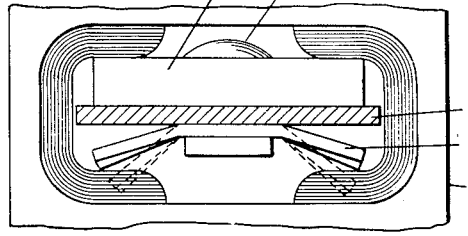
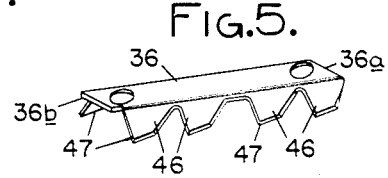
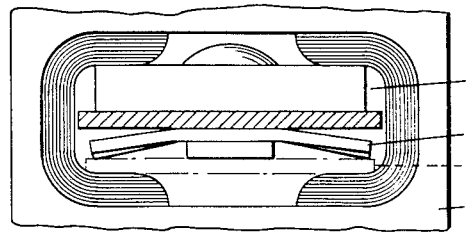
*INVENTOR.*
W. D. HAILES
BY *Forest B. Hitchcock*
HIS ATTORNEY Nov. 6, 1956 W. D. HAILES 2,769,881
CONTACT ASSEMBLY FOR ELECTROMAGNETIC RELAYS
Filed March 15, 1954 4 Sheets-Sheet 2

*INVENTOR.*
W.D.HAILES
BY
*Forest B. Hitchcock*
HIS ATTORNEY

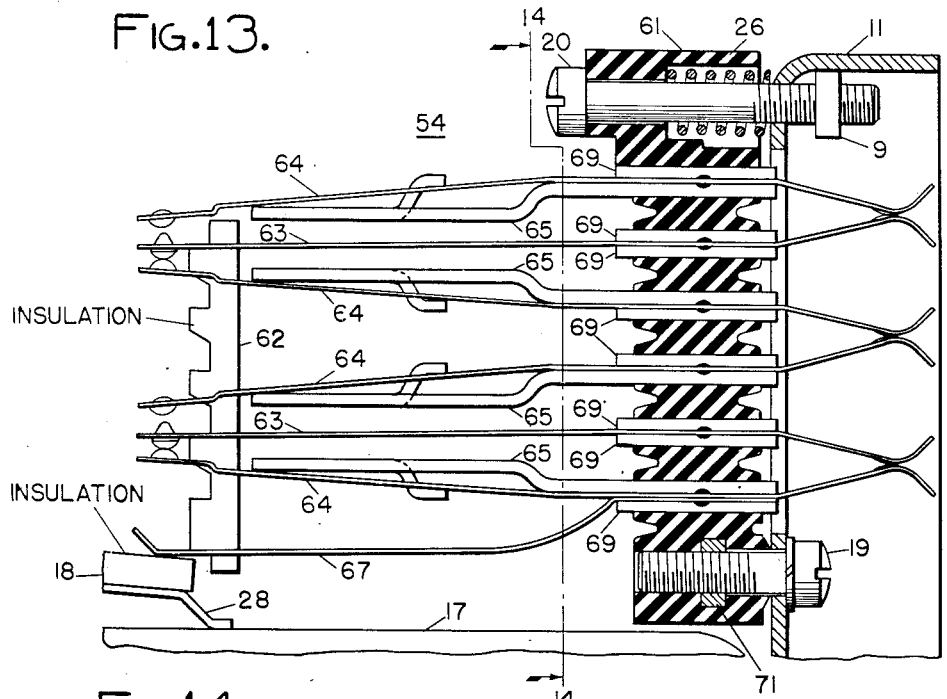
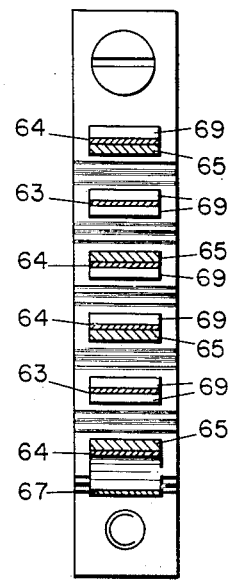
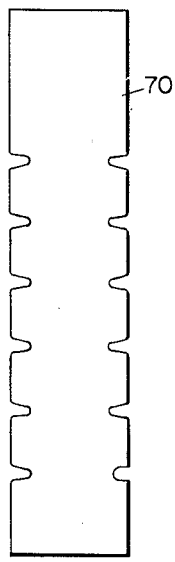
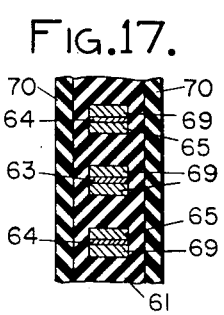
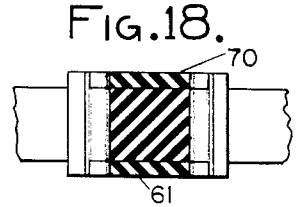
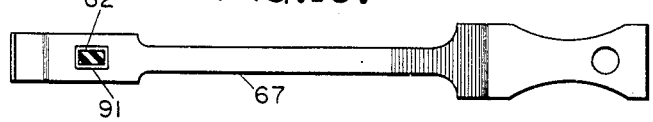

Nov. 6, 1956  W. D. HAILES  2,769,881
CONTACT ASSEMBLY FOR ELECTROMAGNETIC RELAYS
Filed March 15, 1954  4 Sheets-Sheet 4

INVENTOR.
W.D. HAILES
BY
Forest B. Hitchcock
HIS ATTORNEY

United States Patent Office 2,769,881
Patented Nov. 6, 1956

2,769,881

CONTACT ASSEMBLY FOR ELECTROMAGNETIC RELAYS

William D. Hailes, Rochester, N. Y., assignor to General Railway Signal Company, Rochester, N. Y.

Application March 15, 1954, Serial No. 416,373

10 Claims. (Cl. 200—166)

This invention relates to contact assemblies particularly adapted for use in electromagnetic relays, and more particularly pertains to contact assemblies of the multiple contact finger type where the movable contact fingers are linked together by a common pusher member which is in turn operated by the action of the relay armature.

This application is a continuation-in-part of my prior application Ser. No. 329,030, filed December 31, 1952, now Patent No. 2,738,400, dated March 13, 1956; and certain subject matter found in this application common with the subject matter disclosed in such prior application is to be claimed in this application. Such prior application relates more particularly to a structure in which contact finger assemblies are constructed to be mounted in previously molded blocks of insulation; whereas, this application is directed more particularly to the structure of the contact finger assemblies themselves.

In prior contact finger assemblies, such as in my prior Patent No. 2,237,274, dated April 1, 1941, the fixed contact fingers between which the movable contact fingers operated, were held in position by pairs of backstop members. Although it is desirable to have the fixed contact fingers of resilient spring material, it is also desirable that they be held in such a way as to make possible the desired contact pressures and yet allow sufficient resiliency to give the desired contact wipe. In addition, it is desirable to so construct the backstop members with respect to these fixed contact fingers that they will be damped against vibration and thus provide contacts with a maximum stability and freedom from contact bounce.

In prior contact assemblies where a pair of backstop members is employed for each fixed contact spring, there is a certain amount of difficulty in obtaining the exact positioning of these backstop members for molding processes when the supporting blocks are molded. Furthermore, the adjustment of the fingers is required after the molding operation which in some instances may require the bending of the backstop members. When a pair of these members is involved, it is sometimes quite difficult to properly position them by bending.

With the above considerations in mind, it is the purpose of the present invention to provide a single backstop member which can be associated with a contact spring in such a way as to hold it relatively fixed and yet provide the above desired characteristics. It can readily be seen that if a single such backstop is provided, any adjustment will be facilitated since the bending of such backstop member is simultaneously effective with regard to both holding functions of the member.

Another object of the invention is to provide a contact assembly which is adaptable to the multiple finger pusher type organization in such a way as to take advantage of the use of bifurcated fingers and yet provide the desired contact damping to prevent vibration in the respective bifurcations.

For a more detailed description of the parts and the method of their assembly, reference should be made to the following description and accompanying drawings, in which:

Fig. 1 is a sectional view of a typical relay structure having a multiple contact finger assembly mounted thereon as constructed in accordance with a first form of the present invention;

Fig. 2 is an enlarged sectional view of a part of the multiple contact finger assembly of Fig. 1 showing one of the contact fingers in a position in readiness for insertion into the molded contact block;

Fig. 3 is a back view of one of the molded contact blocks of Fig. 1 showing the openings therein and a sectional view of the contact fingers as mounted in such openings;

Fig. 4 is an enlarged view of one of the openings in the molded contact block of Fig. 1 with a contact finger and retaining unit mounted therein as shown in Fig. 3;

Fig. 5 is an enlarged perspective view of one of the contact retainer units shown in Figs. 2 and 4;

Fig. 6 is an enlarged view similar to Fig. 4 and shows the manner in which a tool may be employed to remove the contact retainer unit and associated contact spring;

Fig. 13 is a side view of a multiple contact finger assembly constructed in accordance with a second form of the present invention and adapted to be operated by the electromagnetic relay structure shown in Fig. 1;

Fig. 14 is a front view of the molded contact block holding a number of contact finger structures which are shown in section as taken along line 14—14 of Fig. 13 looking in the direction of the arrows;

Fig. 15 is a plan view of the reenforcing strips used in the molded block of Figs. 13 and 14 to give the desired added strength;

Fig. 16 is a side view of the reenforcing strip shown in Fig. 15;

Fig. 17 is a sectional view of the molded contact block taken on line 17—17 of Fig. 21 to show the relationships of the molded block, the reenforcing strips, and the contact fingers;

Fig. 18 is a partial sectional view taken on line 18—18 of Fig. 21 to show the relation of the reenforcing strips to the remainder of the molded block;

Fig. 19 is a top view of the guide finger shown in Figs. 13 and 21;

Figure 7:
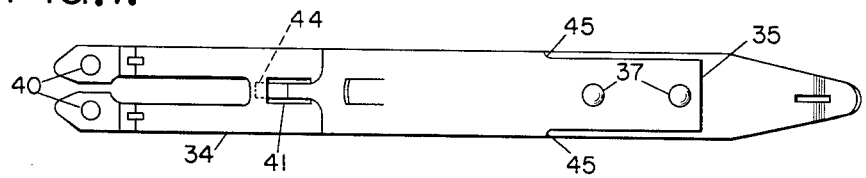
Fig. 7 is a top view of a contact finger assembly as it has been prefabricated for assembly in the molded contact block.

It should be noted that the drawings disclose two forms of contact finger assemblies, either one of which may be employed on the electromagnetic relay structure shown in Fig. 1. The complete relay assembly is shown so as to make it clear just how the contact finger assemblies of this invention are employed in practice.

Referring to Fig. 1, a plug-in type relay has been shown as having a contact assembly 14 mounted thereon as constructed in accordance with the first form of the present invention. This complete relay structure is shown as comprising in general a back plate 11, an electromagnetic structure 12, a cooperating armature 13, a molded contact and finger assembly 14, and a plugboard 15.

More specifically, the electromagnetic structure 12 of the relay includes a coil or winding 16 on a suitable core having a pole face 10 which is adjacent to the armature 13. The armature 13 is L-shaped and pivotally supported on a top yoke 17 so that when the winding 16 is energized, the armature is attracted which causes an extension arm 18 attached to the armature 13 to be raised. This extension arm 18 is of suitable insulating material. The top yoke 17 is attached to the back plate 11 and forms a part of the electromagnetic structure. The extension arm 18 attached to the armature 13 lies between the top yoke 17 and the contact block and finger assembly 14, and is provided with a suitable back-stop support 28 which rests on the top of the yoke 17 when the armature is in its retracted or deenergized position.

The contact block and finger assembly 14 is fastened to the back plate 11 by means of a bolt 19 at the bottom of the contact block 21, while the upper portion of the contact block is held in position by bolt 20. The bolt 19 passes through a hole in the back plate 11 and screws into a nut embedded in the molded block 21. The bolt 19 is tightened merely to the extent to bring the curved portion of the block 21 against the back plate 11 in a manner to be firmly held and yet to permit the block 21 to be adjusted as the bolt 20 is tightened. The block 21 is provided with a recess for the reception of a biasing spring 26, so that the block 21 will be pressed against the head of the bolt 20, and the turning of the screw 20 can cause the position of the block 21 to be adjusted. This bolt 20 passes through a hole in the back plate 11 and its threads enter a nut 9 permanently fastened to the back plate on the inside thereof.

*First form of contact assembly*

The molded contact block and finger assembly 14 constitutes a molded block 21 of suitable insulating material, which has a plurality of similar recesses molded therein for receiving prefabricated contact fingers in different combinations. For the purposes of illustration, a front contact combination A is shown as comprising a fixed contact finger structure and a movable contact finger structure. A back contact combination B is similar except that the fixed contact finger structure is located beneath a movable contact finger structure. In addition, a contact combination C is shown which comprises a fixed front contact finger structure, a movable contact finger structure, and a fixed back contact finger structure. Also, this fixed back contact finger structure for combination C is provided with an idler finger 27, since this back contact finger structure is at the bottom of the assembly. This idler or guide finger 27 is acted upon by the armature extension 18 and serves to position the lower end of a common pusher bar 22 which in turn acts upon all of the movable contact finger structures when the armature is operated. The upper end of this common pusher bar 22 is held in position by the uppermost movable contact finger structure, as will be described later. This pusher bar 22 is, of course, made of suitable insulating material.

Although there is no front view of the relay, it should be understood that two or more of the molded block and contact finger assemblies 14 may be mounted side by side with their respective idler or guide fingers 27 resting on the armature extension 18 so that all such assemblies are operated together. In this way, the relay may be made to have a substantial number of different contact combinations.

In the embodiment shown for this first form of the invention, the molded block 21 is provided with eight recesses for receiving contact finger structures. Referring to the enlarged view of Fig. 2, it will be noted that each of these recesses or holes 30 for receiving contact finger structures or assemblies has bevelled edges 31 at each end. This not only assists in placing the contact finger assemblies, but also increases the surface distance between the adjacent contact finger assemblies to give an added electrical isolation. The center portion of each of the recesses 30 is tapered throughout its entire length for the purpose of providing the draft required to withdraw the pins used in molding these holes. The front end 30a of each hole is approximately two thousandths of an inch larger than the back end of that hole 30b. The center portion of each hole is grooved as shown at 32 (see Fig. 3) for the purpose of allowing the entrance of the contact finger structure which has rivet heads protruding on one side. Since each of these contact finger structures may be inserted with either side up, recess 30 must be provided with a groove 32 on each side. This can be readily seen in the illustration of Fig. 3.

The front and back contact finger structures 24 and 25 are exactly the same in construction where they engage the block 21. The only differences are in their manner of mounting in the molded block 21 and the direction in which the terminal end is formed at the back of the relay. One of these contact finger structures has been shown in detail in Figs. 7 to 9 and enlarged to readily show its structural characteristics.

Since each such structure may be used in either a front or back contact combination A or B, entirely different reference characters are used in these detail figures. This contact finger structure (see Fig. 8) comprises a contact spring 34, a stop member 35 and a retainer unit 36 all fastened together with rivets 37. The contact spring 34 is preferably stamped from Phosphor bronze and is bifurcated at its free end, each bifurcation of which is supplied with suitable contact points or tips 40. These may be made of silver, or other suitable contact material.

Figure 9:
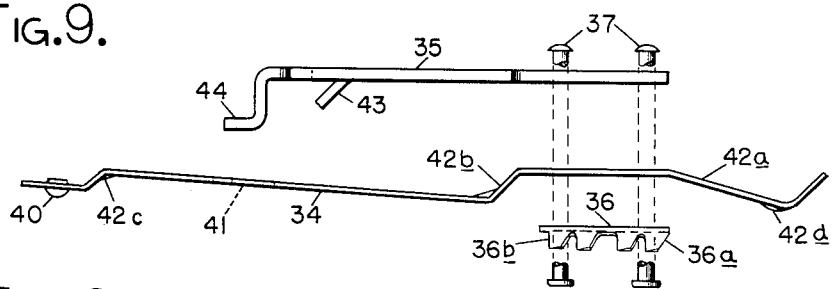
Fig. 9 is an exploded view of the contact finger structure shown in Figs. 7 and 8 to illustrate the relationship between the different parts prior to assembly.

Referring to Fig. 9, it can be seen that the contact spring 34 is stamped with a particular contour including the offsets 42a, 42b and 42c. The offsets 42b and 42c also have slight indentations, one on each side of the center line of the spring 34 right at the point of the offset angle, and these indentations serve to reinforce or stiffen the contact spring at that point. An indentation 42d is provided at the extreme right-hand end to form a sharp nib to serve as a contacting surface for the plug coupling connection as can be seen in Fig. 1.

Figure 10:
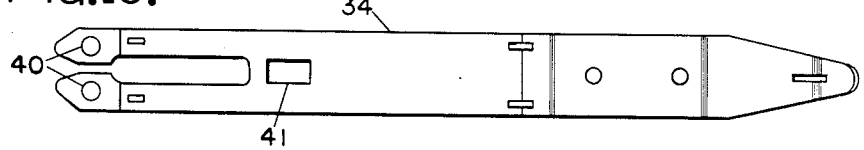
Fig. 10 is a detailed top view of a single contact spring as shown in the contact finger of Figs. 7 and 8.

The contact spring 34, in addition to being bifurcated, is also slotted as can be seen in Fig. 10 to provide a passage space for the free movement of the insulated pusher bar 22. In addition, a rectangular shaped hole 41 is provided for receiving the outer end of hook 44 of the backstop or support member 35.

Figure 8:
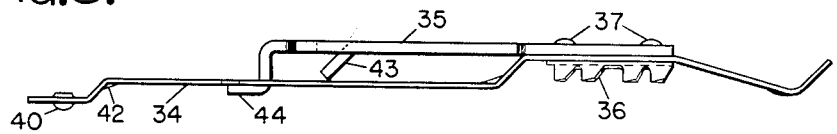
Fig. 8 is a side view of the contact finger assembly shown in Fig. 7.

Referring to Fig. 9, it can be seen that this backstop or support member 35 is provided with an offset finger or backstop hook 44 which, as seen in Fig. 7, is sufficiently narrow as to freely fit into the hole 41 of the associated contact spring 34 for supporting such spring as seen in Fig. 8. The support or backstop member 35 also has a pressed out detent or nib 43 extending downwardly as viewed in Figs. 8 and 9 so that when the contact finger structure is assembled, the contact spring 34 is supported between the hook 44 and the detent or nib 43 as best seen in Fig. 8.

In this connection, it should be noted that the particular preformed contour of the contact spring 34 (see Fig. 9) is such that this spring 34 presses slightly against the detent 43 when the structure is assembled. This means that there is no intentional trapped pressure of the spring 34 against the hook 44. Also, the underpoint of detent 43 is located above the surface of the hook 44 a distance substantially equal to the thickness of the spring 34. In this way, the spring 34 is held in a definite position located by the backstop member 35.

Each contact finger structure or assembly is provided with what may be termed a retainer unit 36 which is shown in perspective in Fig. 5 and which is shown in a side view in Figs. 8 and 9. This retainer unit 36 is preferably made from Phosphor bronze and is of a general U-shape with spread legs in cross section (see Fig. 4). It is formed with a flat surface and two bent sides which extend outwardly at an appropriate angle. Each side is serrated so as to form sawteeth or projections 46. The edges of the projections or teeth are tapered so as to form points as at 47. These successive points along the sides of the retainer unit 36 are bent so as to provide an overall taper in height or offset throughout the entire length which is approximately a few thousandths (such as ten to fifteen thousandths) of an inch smaller at the end 36a than at the end 36b, so that this taper in height of the points will insure that the last point to enter a hole will be properly stressed even though the other points may have enlarged the hole by cutting a small groove in the Bakelite of the block 21.

As above mentioned, the retainer unit 36, the spring finger 34 and the backstop or support member 35 are assembled and permanently fastened together by rivets 37. Referring to Fig. 4, the normal shape of the retainer unit 36 is shown in dotted line, but when the contact finger assembly is inserted into the recess in the molded block 21, the sawteeth 46 are bent upward and outward to assume the full line positions shown in Fig. 4. The degree of this deformation is such as to move the teeth beyond the elastic limit and yield point of the metal, so that the pressure for holding the contact finger assemblies in position will be fixed and stabilized at the value established by the yield point of the retainer. This construction insures that each finger will be held by substantially the same forces acting against the top and bottom faces of the hole in which it is placed even though the finger dimensions and hole dimensions are slightly different because of differences in manufacture that cannot be overcome except at great cost. It also insures that the Bakelite block 21 will not be overstressed or even cracked by forcing an oversize finger assembly into an undersized hole as might be possible with another type of finger design. For example, a spring retainer unit having a yield point of fifty pounds has been found acceptabe in a practical design.

It might be mentioned in this connection that by the insertion of a relatively thin tool 49 into the recess beneath the teeth 46 and from the rear of the block 21, the teeth can be bent still further beyond their yield point and then the contact finger assembly may be readily removed. This is illustrated in Fig. 6 where the tool 49 is shown inserted in one of the holes 30 beneath the contact finger assembly.

Figure 11:
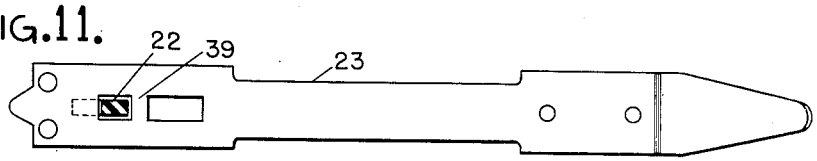
Fig. 11 illustrates a movable contact finger and the associated pusher member which is actuated by the armature for cooperation with the various front and back contact fingers as illustrated in Figs. 1 and 2.

Each of the movable contact fingers 23 (see Figs. 1 and 11) is made with an elongated slot similarly as shown in Fig. 10 for the contact spring 34, except of course there is no bifurcation. The uppermost movable contact finger 23 has its slot divided by web 39 into two parts as shown in Fig. 11. The other movable contact fingers 23 are exactly the same as shown in Fig. 11 but without the web 39.

The web 39 of Fig. 11 provides a small rectangular hole for receiving the upper end of the pusher 22 when it is properly positioned, which hole causes the finger 23 to be engaged by the adjacent protrusion on the pusher 22. It is noted that the larger of the two holes shown in Fig. 11 for the finger 23 is sufficiently large to freely receive the pusher 22, as will be explained below.

Referring to Fig. 1, it will be noted that the movable contact finger 23 is in the second recess from the top of the block 21; and for this reason the pusher 22 has to have its upper section 38 (shown in dotted) removed so that the proper protruding section of pusher 22 will engage the movable contact finger 23. If the combination B were to be used in the upper two spaces for the block 21 instead of the combination A, then the pusher 22 would be of the regular length including the dotted portion 38.

Figure 12:
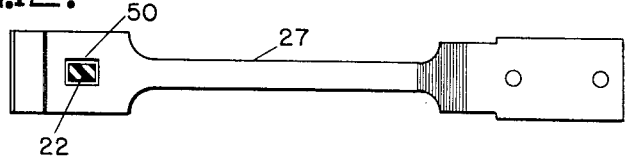
Fig. 12 shows a top view of an idler or guide finger used to hold the pusher member in place.

A top view of the idler finger 27 has been shown in Fig. 12 to indicate its shape and to show that the rectangular hole 50 is of just the proper size to receive the lower end of the pusher 22 and be engaged by the next adjacent protruding portion of the pusher.

When all of the contact finger structures are in position, the pusher bar 22 can then be slipped through the slots in the fixed and movable contact fingers from the top of the complete assembly and down through the larger slot of the upper movable contact spring and the lower end is inserted in the hole in the guide spring 27 which is then pushed downwardly until the upper end of the pusher bar 22 can be slipped forward into the smaller hole of the uppermost movable contact finger. When this is done the pusher bar moves forward to engage each of the movable contact fingers with its corresponding projection. It can thus be seen that the pusher bar 22 then pushes against each of the movable contact springs 23 when the armature 13 is actuated to cause its extension 18 to be moved upwardly.

The pusher bar 22 is provided with a projection at its lower end which engages the hole in the guide spring or idler 27 and there is an extension or protruding portion for each of the successive spaces of the contact block 21 so that a movable contact finger can be placed in any one of several spaces of the contact block and be properly operated by the pusher bar 22. However, when the uppermost space is a front contact, then it is apparent that the uppermost section of the pusher bar must be removed, so that it will be of a length shown in Fig. 1 for properly being received in the hole of the movable contact finger 23 in the second space of the molded contact block 21.

The contacts of a relay are usually adjusted to provide a predetermined gap between the movable and fixed contact points when they are open, and to provide a predetermined contact pressure when they are closed. With the single plate type of stop construction described herein, the fixed contact spring is formed, as above described, to have a particular spring bias against the pressure nib or detent 43 of the stop plate. Thus, even though the stop member 35 is adjusted by bending to move the fixed contact spring to the proper position with respect to the movable contact spring so as to make and break at specified points in the travel of the movable contact, the contact spring 34 is firmly held in the new position and the proper tension is provided when the contacts are closed. This means that the contact springs 35 of the fixed contacts will follow the pressure nib 43 as it is moved up or down when the stop member is adjusted. Since the back-stop hook extension 44 is also a part of the back-stop member 35, it also will not change its position relative to the contact spring 34. Hence, the contact position may be adjusted by a single operation in contrast to prior structures which employ two separate back-stop members, one on each side of the contact spring. It should be noted that when the back-stop member is bent, such bending takes place near the rivets 37 because the back-stop member 35 is narrowed at 45 near the rivets 37 as seen in Fig. 7.

By designing the contact springs 24 and 25 (see Fig. 1) in proper proportions, the contact pressure built up in the fixed contact springs as they are deflected by movable contact springs 23 pushing against them is determined by fixing the amount of contact compression and the amount of movable contact travel. In this way, the necessary contact pressure can be obtained without the cost and time involved in testing the pressure of each individual contact.

In this connection, it should be noted that each of the movable contact springs 23 is preformed so as to have enough pressure or spring bias to fully compress its back contact spring, and thus a relay can be quickly checked without the use of a gauge by noting that each movable contact spring on the relay is following its pusher bar all the way down to its lower position when the armature 13 releases. This built-in pressure for the movable contact springs must be within predetermined limits so that the relay will not require excessive operating current. Thus, a test of the relay to determine its operating characteristics will indicate whether or not the pressure in its movable contact springs are within the proper limits. An excessive operating current will indicate an excessive down pressure of the movable contact springs, but this will not occur except in faulty manufacture or preforming of the movable contacts.

Therefore, it can be readily seen that this construction simplifies the adjustment of each fixed contact to a relatively simple bending operation of the whole fixed contact structure a small amount as may be required to properly locate that finger with respect to its associated movable contact finger to give the values required to that particular relay.

It is also to be understood that various modifications may be made to the structure within the scope of the present invention. For example, the fixed contact fingers can be made into a make-before-break type of contact by bending the pressure nib or detent 43 back into alignment with the backstop member 35 and causing the contact spring 34 to have an intentional trapped pressure against the hook member 44. The stop member 35 can then be adjusted to make and break with its movable contact at any point in its operation.

*Second form of contact assembly*

The molded contact block and finger assembly 54 of Fig. 13 is constructed to replace the contact block and finger assembly 14 of Fig. 1 on the relay structure shown. For this reason no effort has been made to reproduce the relay and plug board structure shown in Fig. 1.

The molded contact block and finger assembly 54 of Fig. 13 can be made to include any desired contact combination as described in connection with the contact block and finger assembly 14 of the first form of the invention. The difference is that, in this second form of the invention, the contact finger structures are molded into the contact block during the molding process so that the desired combination must be determined at that time; whereas, in the first form of the invention, the contact finger assemblies are positioned in the molded block after it has been formed and any combination of contacts can be selected at such time.

As shown in this second form of the invention, the contact block and finger assembly 54 only has six spaces, but it is to be understood that any desired number may be employed within the contemplated scope of the present invention. Also, it is to be understood that two or more of the molded block and contact finger assemblies 54 may be mounted side by side with their respective idler fingers 67 resting on the armature extension 18 so as to have their respective pusher bars 62 operated in the same way as described in connection with Fig. 1. In this way, this second form of the invention may provide a large number of different contact combinations for a relay.

In the embodiment shown in Fig. 13 for this second form of the invention, the molded block 61 is provided with six contact finger structures. Each of these finger structures is made the same except the one which is used at the bottom of the block, which structure then includes the idler spring 67.

More specifically, each stationary or fixed contact finger structure includes a contact spring 64 with an associated retaining or backstop member 65 which is located on that side of the finger next adjacent its associated movable contact finger 63. The spring 64 and the backstop member 65 are held together by suitable spot welding, and the spacer strip 69 is also spot welded to the other side of the spring 64. In other words, the spring 64 is held between the backstop member 65 and the spacer strip 69. Each movable contact spring 63 is also located between two spacer strips 69 which are held together by suitable spot welding.

All of the contact finger structures are then so positioned in a mold that they are in proper positions. In addition, on each side of the mold is placed a strip 70 of "Roger Board," which is well known in the art. These reenforcement strips 70 have a shape shown in Fig. 15. In addition, a nut 71 is also located in the mold. The molding powder, such as powdered "Bakelite," is poured into the mold and subjected to the usual heat and pressure process to produce a solid block of insulated material supporting the different contact finger structures.

In this connection, it should be noted that the "Roger Board" strip mentioned above comprises a wood pulp saturated with a phenolic resin compound which has been formed into a sheet or board in a semi-cured state. When these "Roger Board" strips are used as inserts in a mold and subjected to the usual heat and pressure processes along with added phenolic resin powder, such as "Bakelite," the "Roger Board" partially melts, i. e. at least its outer surfaces and especially along its edges, and mixes with the liquid phenolic resin to form an integral whole when the liquid cools and takes its solid state. This is explained because in Figs. 17, 18 and 20 the "Roger Board" strips have been shown as distinct from the rest of the material by making the shading distinctive; but it is to be understood that actually the molded block in its completed form is an integral mass with the wood pulp fibers located near the outer surfaces of the block to strengthen it longitudinally and tend to prevent its cracking under stresses which develop during the aging of the blocks. This is particularly desirable in view of the fact that the blocks are provided with the indented surfaces or hollows between adjacent contact finger structures to provide the additional surface distances necessary to give the desired insulating separation between the fingers. Also, as can be viewed in Fig. 20, the block is relatively thin adjacent the sides of each contact finger structure, and the presence of the wood pulp fibers adjacent this portion of the block gives the desired added strength.

The front and back fixed contact finger structures are exactly the same, the only difference being their location relative to the movable contact. For this reason, a description of one such structure will be considered sufficient.

Figure 23:
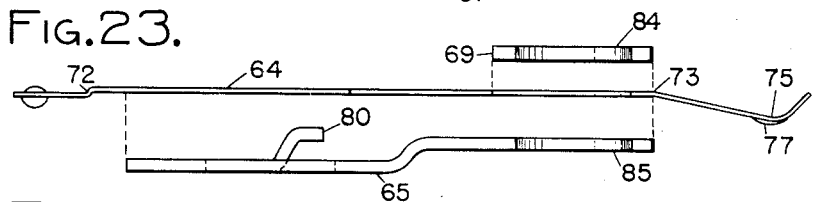
Fig. 23 is an exploded view of the contact finger structure shown in Fig. 20 to illustrate the relationships between the different parts of the structure prior to their being molded in the contact block.

One of the fixed contact finger structures has been shown with its parts separated in Fig. 23. The relative positions of the spring 64 with respect to the backstop member 65 and spacer 69 has been shown by dotted lines. The spring 64 is made straight throughout its length except at the off set points 72, 73 and 75. The offset 72 is for the purpose of providing room enough between spring 64 and spring 63 to ensure that spring 63 will not touch the bifurcated end of backstop 65 when the contacts are in the fully operated position, i. e. when spring 64 is fully compressed by operation of its respective movable spring 63 toward backstop 65. The offsets 73 and 75 are provided to make the spring in the form of a finger proper to act in conjunction with the plugs of the plug board as illustrated in Fig. 1. At the offset 75, a longitudinal indentation 76 is provided to push the finger metal to form a raised portion or ridge 77 to serve as a contacting surface for the plug coupling connection, in the same manner as explained in connection with Fig. 1.

Figure 22:
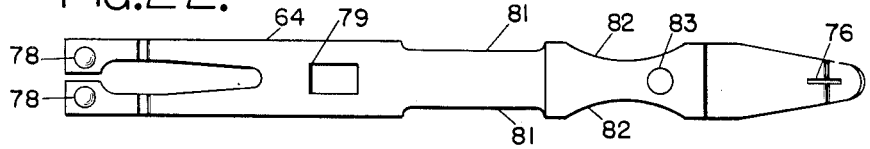
Fig. 22 is a top view of a contact finger as employed in the structure shown in Figs. 13, 20 and 21.

This contact spring 64 is bifurcated at its contacting end and a small contact point 78 is attached to each bifurcation to serve to make good contact with the respective contact points of the associated movable contact finger. These points may be of any suitable material such as contact silver, molybdenum, or the like. The inner portion of the bifurcating slot is enlarged as shown in Fig. 22 to freely receive the pusher arm 62. The finger 64 also has a slot 79 for receiving the offset finger or hook 80 of the backstop member 65.

It will be noted from Fig. 22 that the finger 64 is narrowed at the sections 81 so as to permit the bending action in this area of the finger when it is mounted in position. Thus, any adjustment of the backstop member 65 and its associated finger 64 results in the finger 64 bending in this area and allowing the remainder of the finger to be relatively straight.

Also, the finger 64 is narrowed at its sides along the sections 82 so as to reduce its breadth at this point to allow more of the insulating material of the block to be formed around it to increase the strength of the block. In addition, the hole 83 permits the molding material to pass through the finger 64 and a corresponding hole 84 in the spacer 69 and a similar hole 85 in the backstop member 65. This formation of the molding material passing through the contact finger assembly determines that there is no possibility of endwise movement of the contact finger structure. In this same connection, it will be observed that both the spacer member 69 and the backstop 65 are narrowed at the points 82 to correspond with the contact finger spring 64.

Figure 25:
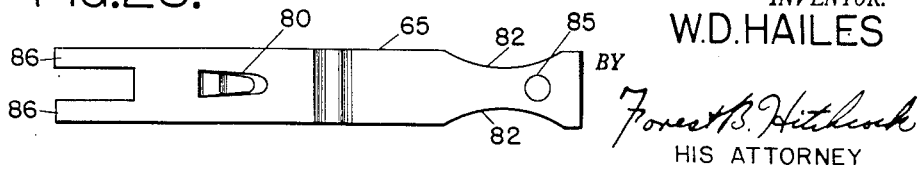
Fig. 25 is a top view of a retainer or backstop member employed in this second form of the invention as shown in Figs. 13 and 21.

Referring to Fig. 25, it will be seen that the backstop member 65 has two bifurcations 86 at its left-hand end which extends towards the end of the contact spring 64. The extreme ends of these bifurcations 86 act as the backstop for the bifurcations of the contact spring as can be seen by the dotted lines in Fig. 20. This provides a positive backstop action for the spring 65 and a damping action with respect to both of its bifurcations; yet the backstop member because of its bifurcations 86 does not interfere with the free movement of the pusher member 62 shown in Fig. 13.

Figure 20:
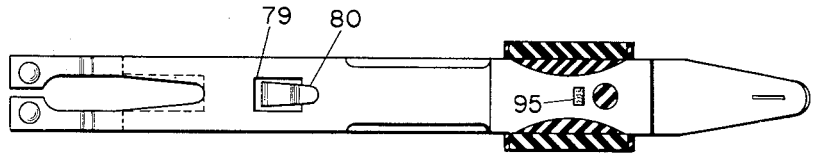
Fig. 20 is a top view of a contact finger structure shown in Figs. 13 and 21 with its relation to the molded block shown in section.

Referring to Fig. 20, it will be seen that the offset finger or hook 80 of the backstop member 65 is sufficiently narrow to freely fit into the hole 79 of the associated contact spring 64. Thus, when the contact spring, backstop and spacer members are assembled and spot welded together, the spring is first placed in position under the hook 80 and moved until the holes 83, 84 and 85 are in alignment. Holes 83, 84 and 85 provide an easy way of locating these parts in their proper relative positions for the spot welding operation. This spot welding has been indicated at 95 in Fig. 20.

Figure 21:
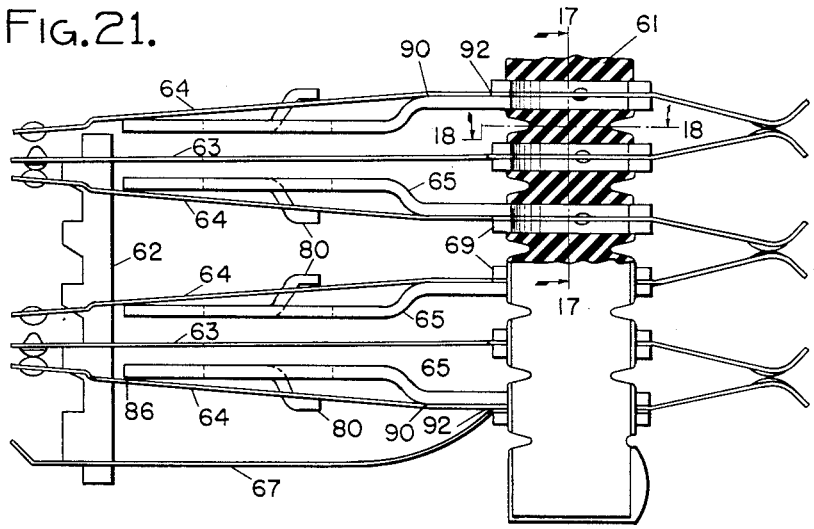
Fig. 21 is a side view of the contact finger assembly of the second form of the invention as shown in Fig. 13 but with certain portions of the molded contact block being shown in section and other portions being shown in full.

Referring to Fig. 21, it will be observed that when the spacer 69, the spring 64 and backstop 65 are assembled, welded and gripped by the Bakelite block, spring 64 is restrained by hook 80 on backstop 65 so that it is bent toward the bifurcated tips of backstop 65 but not far enough to press against the tips of the bifurcations although near enough, e. g. .001 to .002 of an inch, so that the movement of the bifurcations of spring 64 will be restrained if they tend to vibrate upon the make or break of the contact points. The relationship of the inside surface of hook 80 and surface of bifurcations 86 is provided so that a spring 64 will fit between them without cramping but with pressure exerted against hook 80. This arrangement ensures that the spring 64 and back stop 65 will move together when the back stop is bent near its point of support in the Bakelite block 61. This makes it unnecessary to adjust the spring 64 separately, and since the hook 80 on backstop 65 takes the place of any separate pressure producing plate formerly used, the single backstop construction reduces the time and effort needed to properly adjust the contacts of a relay.

Since spring 64 does not press against the bifurcated tips of backstop 65, there is no pressure trapped in the spring 64 when the contact points 78 are not in contact with the movable contact points 87. There is no intentional trapped pressure in the spring 64 against the bifurcated ends of backstop 65; and for this reason, pressure is built up from zero to the final value by the deflection of the spring 64 reacting against hook 80 and the grip provided at the Bakelite block when movable spring 63 and its points 87 are actuated. The final pressure between points 78 and 87 does not depend upon the initial pressure against hook 80. This type of pressure buildup is used for a very high percentage of all contacts; however, it should be understood that special contact adjustments can be made if desired.

For example, a make-before-break can be provided if desired. In this case, it is preferable to use trapped pressure and a much lower rate of buildup of pressure for a given amount of contact movement. To accomplish this with the single backstop member construction of this invention, the following procedure is used.

Spring 64 is bent at or near the knee of backstop plate 65, i. e. at point 90 so as to bear against the bifurcated tips 86 with a predetermined trapped pressure when it is welded to the backstop plate 65 and molded in the Bakelite block 61. Also, hook 80 on backstop 65 is bent away from spring 64 so as not to bear against spring 64. This spring 64 now has a very much slower buildup with deflection because its effective length extends all the way back to the point 92 where it is gripped between the spacer 69 near the Bakelite block. But here again it is unnecessary to adjust the spring 64 separately when adjusting the contact to the desired make-before-break adjustment because the spring 64 follows the backstop 65 as it is bent during adjustment. Since the buildup rate of spring 64 is low, the changes in amount of trapped and final pressures are insignificant as the backstop 65 is bent up or down the small amounts that are needed to bring the make-before-break points at the specified values of the relay stroke.

Figure 24:
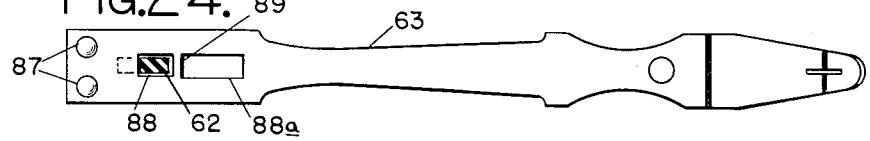
Fig. 24 is a top view of a movable contact spring used in Figs. 13 and 21.

The movable contact springs 63 are contoured as shown in Fig. 24. That portion of the spring which cooperates with the block and the plug coupling arrangement is identical to the fixed contact spring shown in Fig. 22. However, this spring is not bifurcated at its left-hand end, but both of the contact points 87 are held relatively rigid with respect to each other. A slot 88 is provided to receive the pusher member 62 as shown in Fig. 24. The particular spring shown in this figure is for the top movable contact spring 63 and has a webbed portion 89 so that the upper end of the pusher 62 is held in proper alignment. But in the other movable contact springs such as the lower one shown, this web 89 is not present and the entire slot 88 and 88a are combined to allow the insertion of the pusher member until its upper end is located in the slot 88 as shown in Fig. 24 and its lower end is received in the slot 91 of the guide finger 67 as shown in Fig. 19. It will also be observed that the central portion of this finger 63 is tapered so as to allow its bending action upon operation of the pusher 62 to be distributed throughout its central area.

In this way, the contact finger with the single backstop member is constructed to extend the outer support closer to the ends of the contact springs 64 and render it more stable throughout its width particularly with respect to both of its bifurcations. This prevents a rocking or rolling action and more effectively maintains the stability of the fixed contact fingers. This structure also makes it possible to adjust either a front fixed contact or a back fixed contact finger assembly to make contact with the movable contact finger at a specified point in the relay stroke by a simple bending operation performed on the backstop member near its support in the insulating block.

This adjusting operation is done by using a bending tool having a slot wide enough to fit over the backstop 65 and the contact spring 64 where they lie together between points 90 and 92 just outside of the Bakelite block 61. With this bending tool, the whole stationary finger structure or assembly is bent upward or downward as required to put the contact in the proper position with respect to the relay stroke. Since the finger moves as a unit, this bending operation does not materially change the relationship between the stop 65 and contact spring 64. Therefore, it is unnecessary to adjust the positions of the hook 80 or the bifurcations 86 on backstop 65 with respect to the spring 64. This saves time and expense involved in the manufacture and adjusting of the contact assemblies.

In both forms of the invention, the contact spring is formed in a way to provide a normal compression of the spring by a pressure arm or projection near an intermediate point on the associated backstop member, while the outer end of the backstop member acts as a stop or restraining arm as well as a vibration damping means. The pressure arm or projection is nib 43 in the first form and hook 80 in the second form, while the restraining arm is offset finger 44 in the first form and bifurcations 86 in the second form. In this way, both forms provide definite points around which the contact spring is cramped when the associated movable contact spring is actuated by the electromagnetic relay.

Having thus described two forms of a contact finger assembly employing single backstop members for each fixed contact finger as one specific embodiment and illustration of the present invention, it is to be understood that these forms are selected to facilitate in the disclosure of the invention rather than to limit the number of forms which it may assume; and it is to be further understood that various modifications, adaptations and alterations may be applied to the specific form shown to meet the requirements of practice without in any manner departing from the spirit or scope of the present invention.

What I claim is:

1. In a contact finger assembly for relays, a contact spring having contact points attached at one end and having its other end held by an insulated block with a portion protruding for an electrical connection, a single backstop member of relatively rigid material located substantially parallel to said contact spring and having one end held by said insulated block and having its other end extending adjacent said contact spring, said backstop member having a protruding finger for hooking into said contact spring and at a spaced point having an extending detent, said detent and finger acting to hold said contact spring relatively stable.

2. In a contact finger assembly for relays, a contact spring having one end bifurcated with a contact point mounted on each bifurcation and having its other end shaped to form a part of a plug connector, a backstop member of relatively rigid material located substantially parallel to said spring and having bifurcations at one end to act as backstops respectively for the bifurcations of said spring, said backstop member having a retaining finger intermediate of its length inserted in a hole of said contact spring to bend said spring close to said backstop bifurcations, and said other ends of said backstop and said contact springs being securely mounted in an insulated block.

3. In a contact finger assembly for relays, a contact spring having one end bifurcated and having its other end mounted in an insulated block, said bifurcations of said contact spring having contact points mounted thereon, a single backstop member of relatively rigid material having one end anchored in said insulated block and having its other end extending substantially parallel to said spring with bifurcated portions at its outer end for acting as stops respectively for the bifurcations of said contact spring, said contact spring having a hole intermediate of its length, and said backstop member having an extending finger spaced from said bifurcated stop portions and received by said hole and acting to hold said spring close to said bifurcated stop portions.

4. In a contact finger assembly for relays, a contact spring having contact points mounted at one end and having its other end formed in an insulated block but extending therefrom for electrical connections, a single backstop member of relatively rigid material having one end anchored in said insulated block and having its other end extending substantially parallel to said contact spring, said contact spring having a hole located at an intermediate point, said backstop member having an extending finger spaced from said bifurcated stop portions and adapted to be received by said hole of said contact spring for drawing it towards said backstop member, and said backstop member also having an extending detent close to which said contact spring is held by said extending finger.

5. In a contact finger assembly for relays, a contact spring having contact points mounted at one end and having its other end formed to receive wire connections, a single backstop member of relatively rigid material located substantially parallel to said spring, said backstop member having one end to act as a relatively fixed stop and a retaining finger intermediate of its length for holding said contact spring near said stop, and an insulated mounting block for supporting the other ends of said backstop and said contact spring.

6. In a contact finger assembly for relays, a contact spring having one end bifurcated and having its other end mounted in an insulated block, said bifurcations of said contact spring having contact points mounted thereon, a single backstop member of relatively rigid material having one end attached to said contact spring at its end opposite to said bifurcations and mounted in an insulated block, said backstop member extending substantially parallel to said spring and having a hooked finger at its outer end for entering a recess in said contact spring to hold it toward said backstop member, and a detent intermediate of the length of said backstop member extending toward said contact spring and acting to hold it adjacent said extending finger.

7. In a contact finger assembly for relays, a plurality of contact springs, each of the contact springs having contact points mounted at one end having its other end attached within an insulated block but extending therefrom for electrical connections, a single backstop member for each of said contact springs and constructed of relatively rigid material with one end attached in said block and its other end extending substantially adjacent to its respective contact spring, each of said contact springs having a hole located at an intermediate point, each of said backstop members having an extending finger at an intermediate point received by the hole of its respective contact springs for drawing it towards said backstop member to constitute a so-called fixed contact, a plurality of movable contact springs associated with said fixed contacts said contact springs and backstop members being arranged in combinations to form front and back fixed contacts relative to their respective movable contact springs each of which have contact points adapted to cooperate with their corresponding fixed contacts, and a pusher member connecting all of said movable contact springs for operating them to front and back contact making positions.

8. In a contact finger assembly for relays, a plurality of contact springs, each of the contact springs having contact points mounted at one end having its other end attached within an insulated block but extending therefrom for electrical connections, a single backstop member for each of said contact springs and constructed of relatively rigid material with one end attached in said block and its other end extending substantially adjacent to its respective contact spring, each of said contact springs having a hole located at an intermediate point, each of said backstop members having an extending finger at an intermediate point received by the hole of its respective contact springs for drawing it towards said backstop member to constitutes a so-called fixed contact, a plurality of movable contact springs associated with said fixed contacts, said contact springs and backstop members being arranged in combinations to form front and back fixed contacts relative to their respective movable contact springs each of which have contact points adapted to cooperate with their corresponding fixed contact springs, a pusher member having projections coacting with all of said movable contact springs for operating them to front and back contact making positions, a guide spring mounted on said block for holding one end of said pusher member, and a recess in the movable spring for receiving the other end of said pusher member and holding it from lateral movement so that said projections on said pusher members will properly engage each of the remaining movable contact springs for operating them as said pusher member is longitudinally moved.

9. In a contact finger assembly for relays, a contact spring, a relatively rigid backstop member, means connecting said spring and said backstop members together at one end, the other end of said backstop member acting as a stop for said contact spring and also at an intermediate point having an extending hooked finger passing through a recess in said contact spring to hold it close to said stop.

10. In a contact finger assembly for relays, a contact spring, a relatively rigid backstop member, means anchoring said spring and said backstop at one of their ends so that they extend outwardly substantially parallel to each other, a pressure arm connected to said backstop member intermediate to its length, said spring having a normal compression against said pressure arm, and a restraining arm at the outer end of said backstop member for limiting movement of the outer end of said contact spring in one direction but not the other.

References Cited in the file of this patent

UNITED STATES PATENTS

| | | |
|---|---|---|
| 1,580,715 | Fereday | Apr. 13, 1926 |
| 2,069,162 | Hailes | Jan. 26, 1937 |
| 2,069,169 | Leake | Jan. 26, 1937 |